United States Patent
Gethings (10) Patent No.: US 6,892,562 B2
(45) Date of Patent: May 17, 2005

(54) FASTENING APPARATUS AND METHOD

(75) Inventor: Michael Shaun Brian Gethings, Coseley (GB)

(73) Assignee: Tentec Limited (GB)

( * ) Notice: Subject to any disclaimer, the term of this patent is extended or adjusted under 35 U.S.C. 154(b) by 0 days.

(21) Appl. No.: 10/393,770

(22) Filed: Mar. 7, 2003

(65) Prior Publication Data

US 2003/0177806 A1 Sep. 25, 2003

Related U.S. Application Data

(63) Continuation of application No. PCT/GB01/02258, filed on May 22, 2001.

(30) Foreign Application Priority Data

Sep. 18, 2000 (GB) .............................................. 0022813

(51) Int. Cl.[7] .............................................. B21B 31/07
(52) U.S. Cl. ......................................... 72/237; 384/556
(58) Field of Search ...................... 72/237, 238; 384/99, 384/556; 403/31

(56) References Cited

U.S. PATENT DOCUMENTS

| | | | |
|---|---|---|---|
| 3,627,388 A | * | 12/1971 | Jennings et al. .............. 384/99 |
| 3,822,081 A | * | 7/1974 | Mercer et al. .............. 384/617 |
| 3,966,282 A | | 6/1976 | Overton |
| 4,000,638 A | | 1/1977 | Thomas |
| 4,341,426 A | * | 7/1982 | Clapp .......................... 384/487 |
| 5,029,461 A | | 7/1991 | Lawrence et al. |
| 6,132,101 A | * | 10/2000 | Landy, III ................... 384/559 |

FOREIGN PATENT DOCUMENTS

DE        3818312        12/1989

* cited by examiner

*Primary Examiner*—Lowell A. Larson
(74) *Attorney, Agent, or Firm*—Gauthiers & Connors (57) ABSTRACT

A fastening apparatus adapted for use with a chock and a roll which locates within the chock such that a first end of the roll projects through and beyond a first end of the chock and a second end of the chock is located relative to the roll. The apparatus comprises a housing, a piston movably situated within the housing to allow a plurality of circumferentially spaced locating portions of the piston to be retained within the housing or to project through corresponding openings in the housing, pressure means provided within the housing to act on the piston, and at least one fastening member attached to the housing. In an operative position of the apparatus the housing is placed between the first end of the chock and the first end of the roll, and the pressure means acts between the piston, forcing the locating portions of the piston into location with the first end of the chock, and, forcing the at least one fastening member into location with the first end of the roll. Thus the first end of the roll is forced away from the first end of the chock and, with location of the second end of the chock relative to the roll, the chock and roll are fastened relative to each other.

17 Claims, 6 Drawing Sheets

FASTENING APPARATUS AND METHOD

This application is a continuation of PCT Application No. PCT/GB01/02258 filed May 22, 2001.

The invention relates to a fastening apparatus and method, and particularly to a hydraulic fastening apparatus comprising a hydraulic clamp nut and a method of using the same.

There are many applications where it is desired to fasten two units together. For example, in the steel industry, it is desired to locate a chock over each end of a roll and fasten the roll in position relative to the axis of the chocks. Conventionally, the roll is provided with a section of reduced diameter in the proximity of, but not at, each end thereof. Thus a head portion is provided at each end of the roll, which, in use, projects out of an end of a respective chock. A split ring is located and fixed around each reduced section, and acts between the head portion and respective chock, serving to fasten the roll in position relative to the chocks. The split rings in this application are generally heavy, as much as 16 kg, and are usually manually applied to the roll. Such application is often awkward and difficult to achieve, and has health and safety implications. In addition, as location and removal of a split ring is achieved by applying a force thereto, damage to the roll, chock and/or split ring can occur.

According to the present invention there is provided a fastening apparatus adapted for use with an annular chock and a roll which locates within the chock such that a first end of the roll projects through and beyond a first end of the chock and a second end of the chock is located relative to the roll, the apparatus comprising an annular housing, an annular piston movably situated within the housing to allow circumferentially spaced locating portions of the piston to be retained within the housing or to project through corresponding openings in the housing, pressure means provided within the housing to act on the piston, and at least one fastening member attached to the housing, such that in an operative position of the apparatus the housing is placed between the first end of the chock and the first end of the roll, and the pressure means acts on the piston, forcing the locating portions of the piston into location with the first end of the chock, and, forcing the at least one fastening member into location with the first end of the roll such that the first end of the chock is forced away from the first end of the roll and, with location of the second end of the chock relative to the roll, the roll and chock are fastened relative to each other.

The pressure means may comprise resilient means, or may comprise hydraulic means.

BRIEF DESCRIPTION OF THE DRAWINGS

Embodiments of the invention will now be described by way of example only, with reference to the accompanying drawings, in which.

Figure 1:
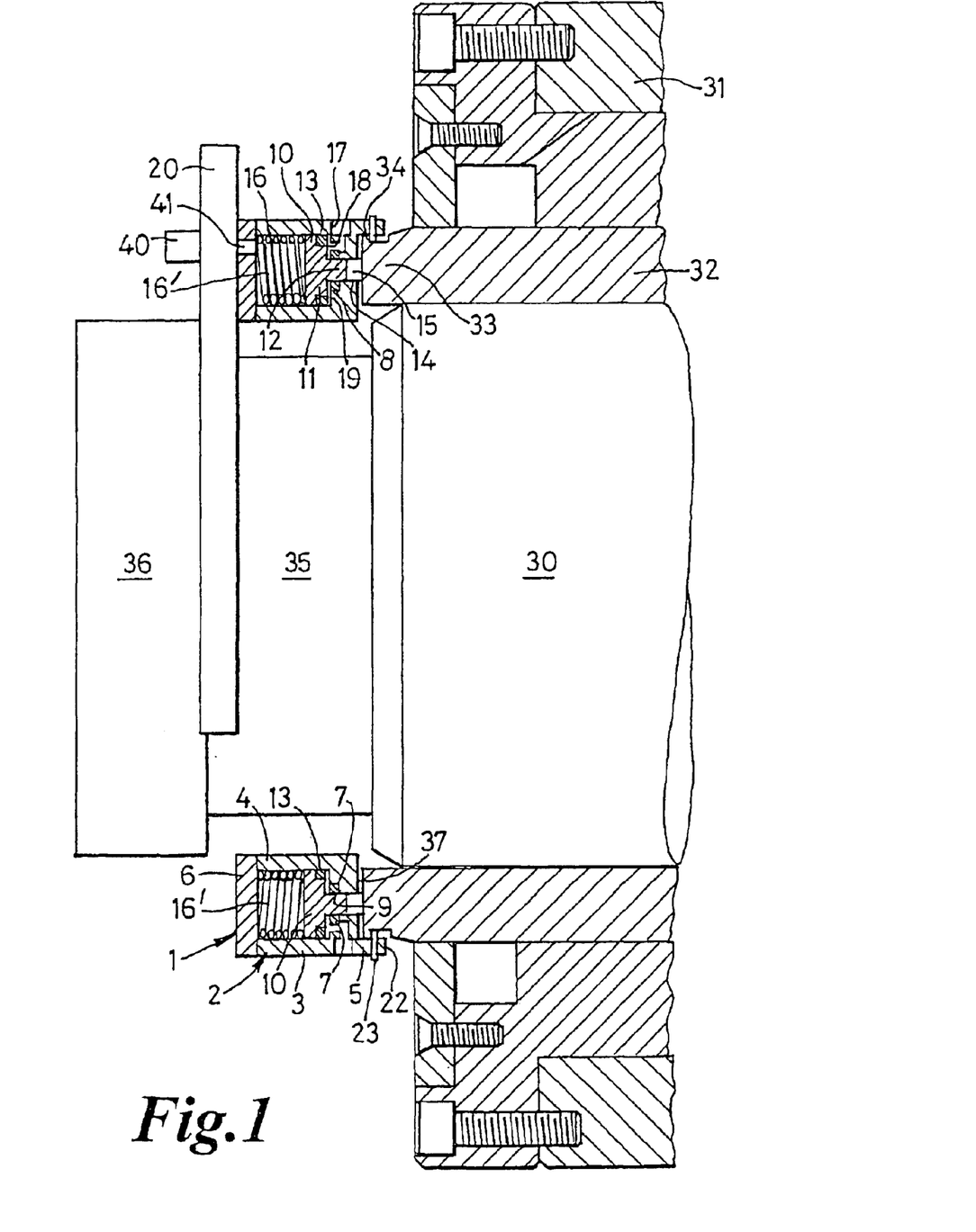
FIG. 1 is a composite cross sectional view of a first embodiment of a fastening apparatus according to the invention, shown in an inoperative position in relation to a chock and roll, to be fastened.

With reference to FIG. 1, the fastening apparatus 1 comprises an annular housing 2 which is substantially hollow and which comprises an outer circumferential side wall 3, an inner circumferential side wall 4 and an axially inner radial end wall 5. An axially outer radial end wall is provided for the annular body by a closure plate 6, attached to the two side walls by cap screws (not shown). The axially inner end wall 5 is provided with internal annular shoulders 7. Annular o-ring seals 8 are seated on the shoulders 7. An annular recess 9 is provided between the shoulders. An annular piston 10 is located within the housing 2 of the fastening apparatus. The piston is generally T-shaped in cross section, and is provided with annular shoulders 11, and an annular stem 12 between the shoulders. Annular o-ring seals 13 are seated against the shoulders 11.

At sixteen positions around the annular housing 2 (see FIG. 2) a number of additional features are provided in the fastening apparatus. At each position, a hole 14 (FIG. 1) is provided in the axially radial inner end wall 5, the hole being of the same diameter and co-operating with the recess 9. A locating portion of the piston in the form of a plunger 15 is located in the hole, the plunger being smeared with grease and forming a sliding fit within the hole. The plunger abuts the stem 12 of the piston. In the inoperative position of the fastening apparatus, the plunger 15 extends through the hole 14, and beyond the inner surface of the axially inner radial end wall 5 of the housing 2. A pocket 16 is provided in the annular housing opening to the piston at each of the sixteen positions, and a stack of six disc springs 16' is located in the pocket. The springs 16', in their relaxed state, are of such size as to protrude from the pocket, away from the piston. When the closure plate 6 is screwed onto the housing the springs are tensioned and act on the piston to urge the piston 10 towards the axially inner wall 5 of the housing 2, causing the plunger 15 to extend through the hole 14 and beyond the housing 2. Hydraulic means 17 is provided as follows. At two of the positions an opening 17' is provided in the side wall 3 of the housing 2. The openings 17' co-operate with a first annular chamber 18 provided between the piston 10 and the axially inner radial end wall 5 of the body 2. Channels (not shown) are provided in the piston connecting the first annular chamber to a second annular chamber 19 provided between the piston 10 and the axially inner radial end wall 5. One opening 17' is used to introduce hydraulic fluid into the chambers, and one opening is used to remove hydraulic fluid from the chambers.

Figure 2:
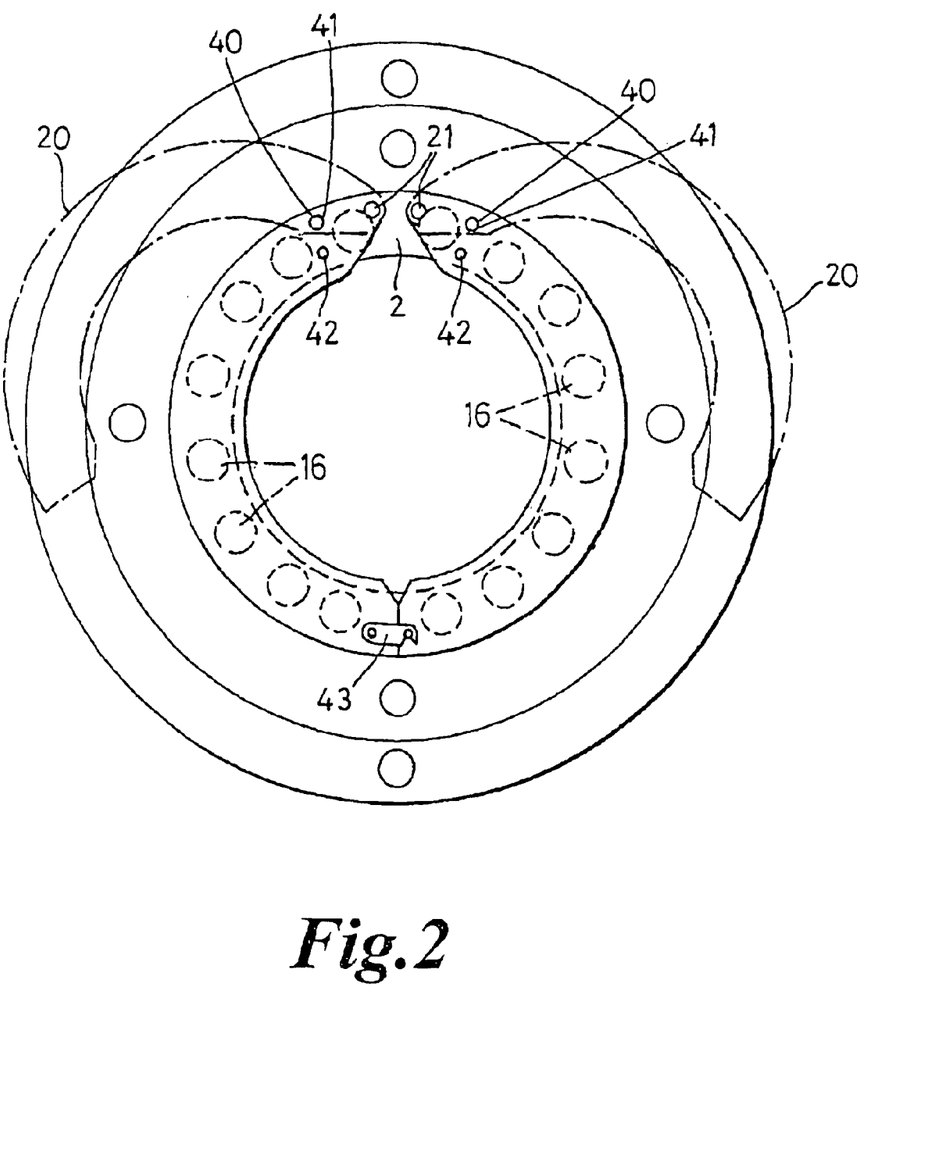
FIG. 2 is a schematic end view of the fastening apparatus of FIG. 1.

The fastening apparatus further comprises a pair of fastening arms 20. Each arm comprises an arcuate plate, and is pivotably attached to the closure plate 6 by a pin 21 (FIG. 2) such that they can be moved from an open position shown in FIGS. 1 and 3, and in broken lines in FIG. 2, to a closed position shown in full lines in FIGS. 2 and 4. The fastening arms 20 are fixed in the open position by location of spring loaded pins 40 in holes 41 (FIG. 2). To place them in the closed position, the pins are removed from holes 41, allowing the arms to swing into the closed position and be fixed there by location of the pins in holes 42. The axially inner radial end wall 5 of the housing 2 of the fastening apparatus is provided with an annular rim 22 in which one or more pins 23 are accommodated.

Figure 3:
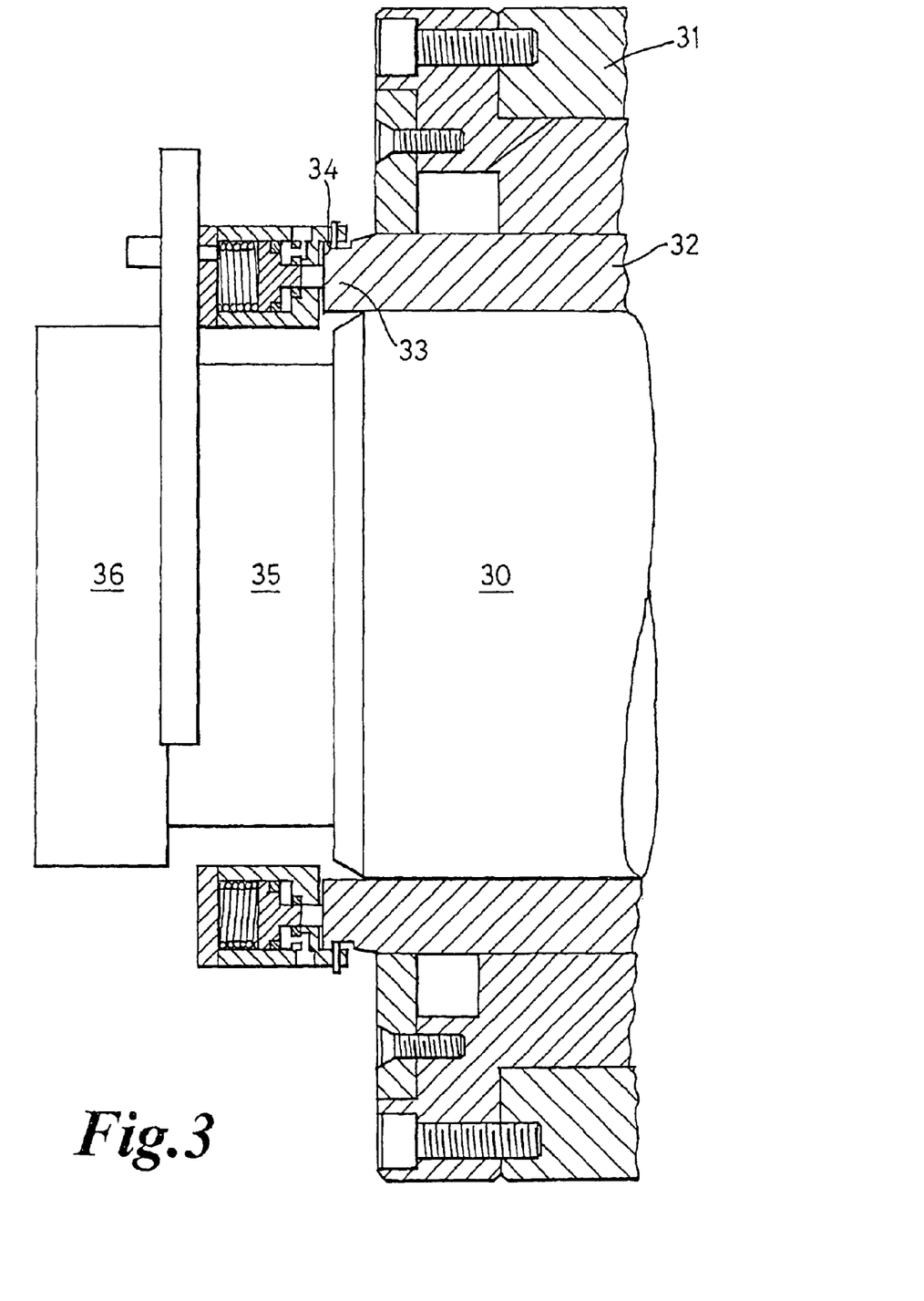
FIG. 3 is a composite cross sectional view of the fastening apparatus of FIGS. 1 and 2 and the chock and roll, the fastening apparatus being shown in a position intermediate the positions of FIGS. 1 and 4.
Figure 4:
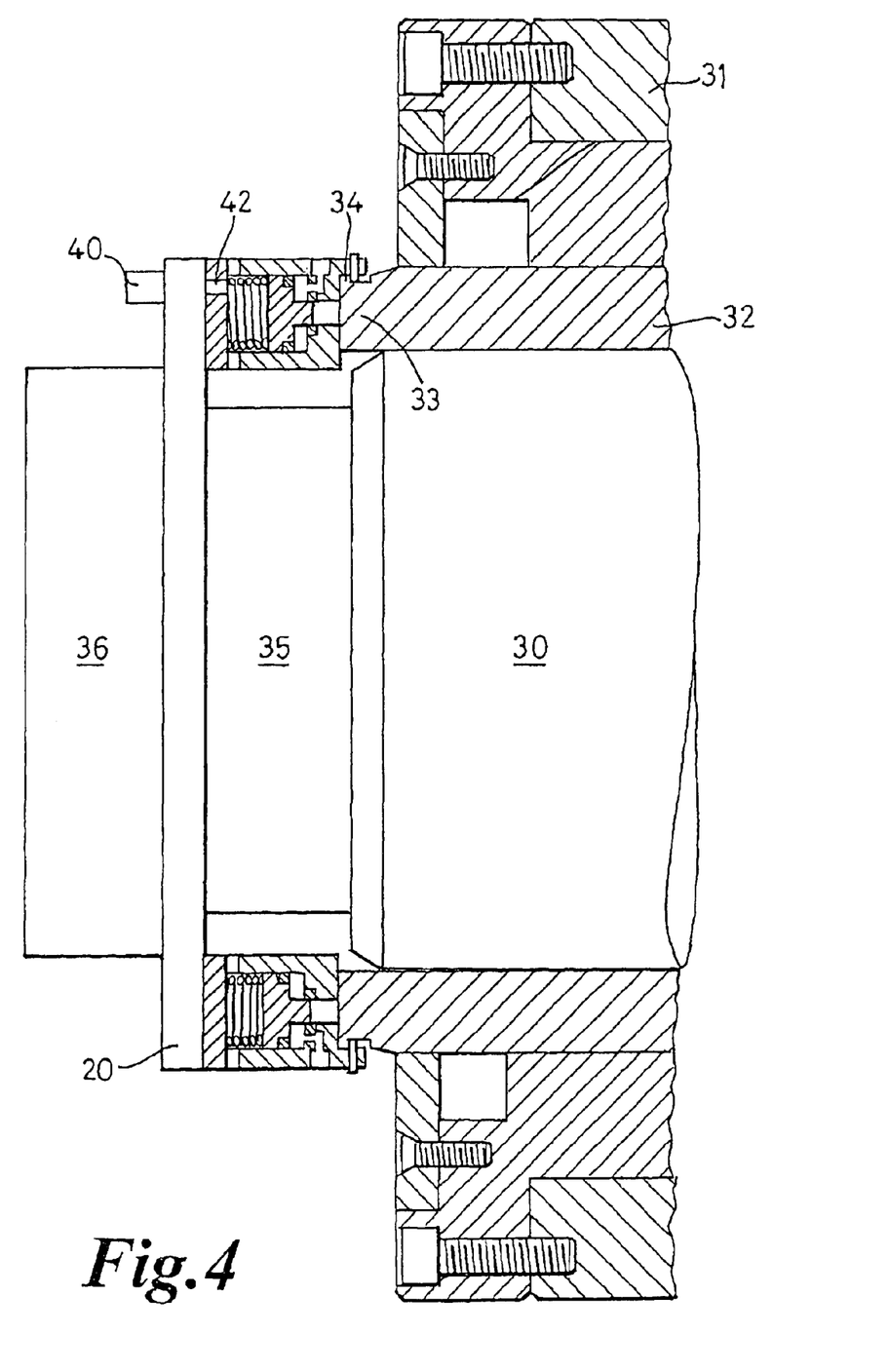
FIG. 4 is a composite cross sectional view of the fastening apparatus of FIGS. 1 to 3 and the chock and roll, the fastening apparatus being shown in an operative position.

Referring to FIGS. 1, 3 and 4 operation of the fastening apparatus will now be described. The fastening apparatus is used to fasten together a roll 30 relative to a cylindrical chock 31. The fastening apparatus is placed between a first end of the roll and a first end of the chock. The second end of the chock is located relative to the roll, by abutment against a shoulder (not shown) provided on the roll. The second end of the roll may be fastened to a second chock, by a fastening apparatus as herein described.

The chock shown comprises a cylindrical bearing follower 32, which is provided with an end portion 33 of reduced diameter. The end portion is provided with a rim 34. The rim 22 of the axially inner radial end wall 5 of the fastening apparatus is located over the end portion 33 and the pins 23 locate behind the rim 34 of the bearing follower to prevent inadvertent removal of the fastening apparatus from the bearing follower. The fastening apparatus is movably attached to the bearing follower by location of the rims such that the fastening apparatus is held securely to the bearing follower but can be moved axially with respect thereto. As will be appreciated, the fastening apparatus can remain in place on the bearing follower, there is no need to remove the apparatus therefrom to disengage the chock from the roll.

The first end of the roll 30 comprises a neck portion 35 of reduced diameter and a head portion 36. To fasten the roll to the chock, the first end thereof is inserted through the aperture in the chock such that the neck portion 35 is surrounded by the fastening apparatus and the head portion 36 extends beyond the closure plate 6 of the fastening apparatus, as shown in FIG. 1. The roll is of similar diameter to the bearing follower 32 and is a sliding fit within the bearing follower. The axial length of the fastening apparatus (excluding the annular rim 22) in the inoperative position shown in FIG. 1, typically approximately 61 mm, is larger than the axial length of the neck portion 35 of the roll. In this position the fastening arms 20 extend beyond the neck portion 35 as shown in FIG. 1, and are located out of contact with the head portion 36 of the roll as shown in FIG. 2.

To activate the fastening apparatus the hydraulic means 17 introduces grease from a grease gun, via one of the openings 17', into the first annular chamber 18 and, from there via the channels in the piston 10, into the second annular chamber 19. Introduction of fluid into these chambers causes the piston 10 to be forced away from the axially inner radial end wall 5 of the housing 2, against the force of the stacks of disc springs 16'. This, in turn, causes the plungers 15 to be retracted to protrude only slightly from the axially inner radial end wall 5 of the housing 2 of the fastening apparatus. This leaves an annular gap 37 between the axially inner radial end wall 5 and the end portion 33 of the bearing follower, as shown in FIG. 1. The axial length of the fastening apparatus (again excluding the annular rim 22) is thus reduced, typically to approximately 59.5 mm, to be smaller than the axial length of the neck portion 35 of the roll. The fastening apparatus is then moved axially along the bearing follower 32, such that the plungers 15 abut the bearing follower. The fastening arms 20 may now be accommodated within the axial length of the neck portion 35, and are swung in an anti-clockwise and a clockwise direction respectively to each engage and surround a semicircular section of the neck portion 35 of the roll (FIG. 4). The fastening arms are fixed in this position by location of spring loaded pins 40 in holes 42 and operation of the C-clip 43 (FIG. 2). The hydraulic fluid is then removed from the chambers 18,19. The stacks of disc springs 16' act to push the plungers 15, via the piston 10, into engagement with the end portion 33 of the bearing follower, and to push the fastening arms 20, via the closure plate 6, into engagement with the axially inner surface of the roll head portion 36. When in this operative position, the axial length of the fastening apparatus (again excluding the annular rim 22) is typically 60 mm, the plungers 15 protrude slightly from the axially inner radial end wall 5 and the piston is not in contact with the end wall 5, as shown. Typically, approximately a 2 tonne force is generated by the fastening apparatus. As the second end of the chock is located against a shoulder of the roll, forcing the first end of the roll away from the first end of the chock fastens the roll and chock relative to each other.

To unfasten the roll relative to the chock, the fastening apparatus is deactivated as follows. Hydraulic fluid is again introduced into the chambers 18, 19, forcing the piston 10 away from the axially inner radial end wall 5 against the force of the stacks of disc springs 16'. This again causes the plungers 15 to be retracted within the holes 14 of the wall 5, and an annular gap to be provided between the wall 5 and the end portion 33 of the bearing follower. The fastening apparatus is moved axially towards the end portion 33, and the fastening members 20 can then be released and moved out of contact with head portion 36 of the roll. The hydraulic fluid is then removed from the chambers.

The chock further comprises a bearing, which, in use, may heat up and expand. As the second end of the chock is located against the shoulder of the roll, this end cannot move and, as a result of the expansion of the bearing, the first end of the bearing follower will be caused to move axially outwards towards the first end of the roll. It is desirable to limit this movement, to for example 0.3 to 0.9 mm, as otherwise the chock and the bearing follower thereof will get out of position with respect to the roll, causing the follower to wear. In the present invention, the fastening apparatus when in the operative position applies an approximately 2 tonne force between the bearing follower and the roll. When the bearing follower heats up it can overcome this force, and will push against the plungers 15 which will, in turn, push the piston 10 against the force of the stacks of disc springs 16'. This will cause the piston to move axially outwards towards the closure plate 6. The piston will continue to move until the disc springs 16' are fully compressed against the closure plate, at which point no more expansion of the bearing follower will be accommodated. The fastening apparatus is designed such that when in the operative position before any heating of the bearing follower, the distance between the axially outer end of the piston 10 and closure plate 6 is approximately 0.5 mm. The maximum expansion of the bearing follower which will be accommodated is therefore 0.5 mm. The abutment of the piston on the closure plate provides a positive stop for the bearing follower. The bearing follower will be provided with a manufacturer's maximum expansion tolerance, the maximum expansion accommodated by the fastening apparatus should be less than or equal to this tolerance.

When the bearing cools down it will contract. The plungers will then be able to move out of and away from the housing under the influence of the stacks of disc springs, and will exert a force on the bearing follower to push it back to its desired axial location.

Figure 5:
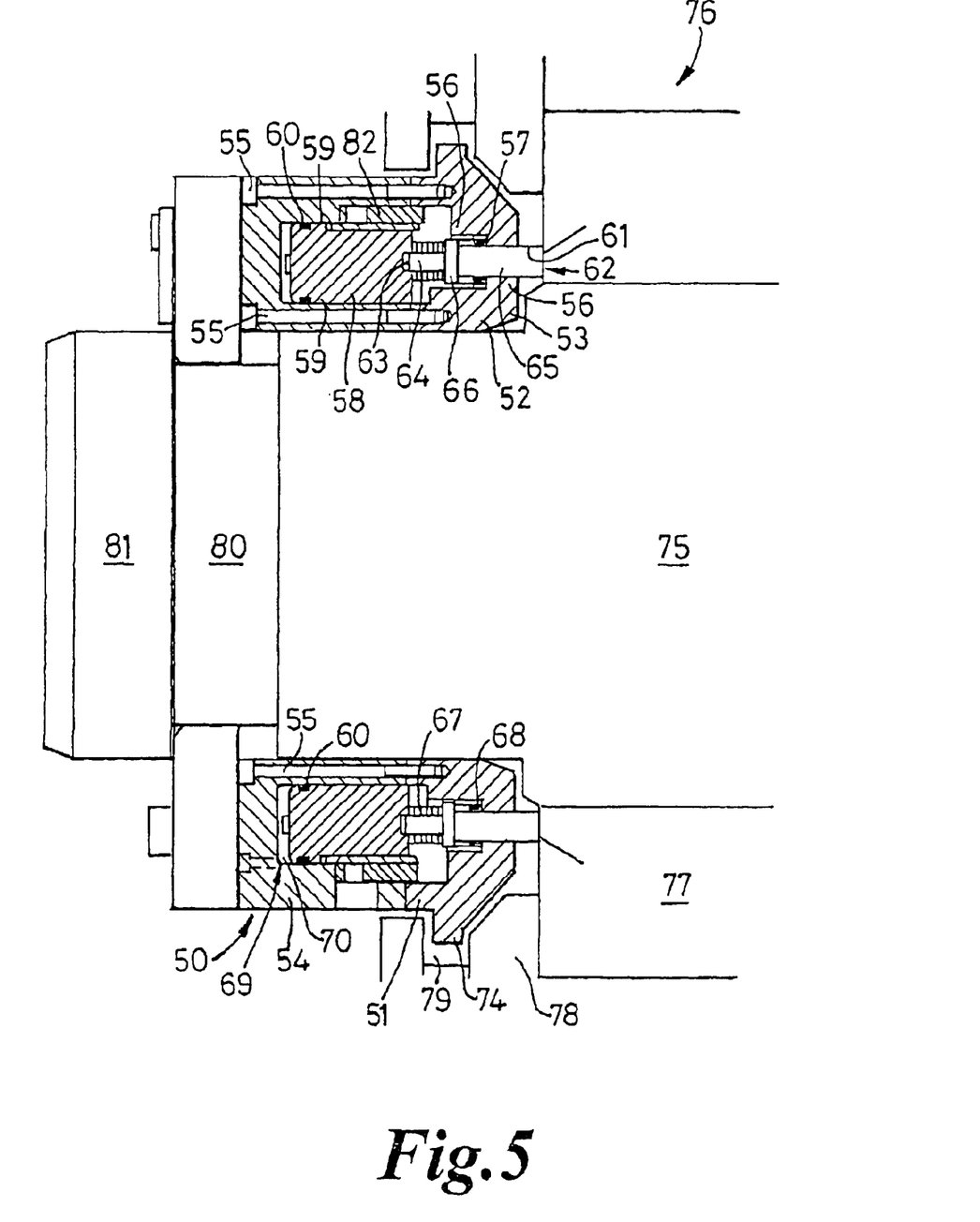
FIG. 5 is a cross sectional view of a second embodiment of a fastening apparatus according to the invention, shown in an operative position in relation to the chock and roll, to be fastened.
Figure 6:
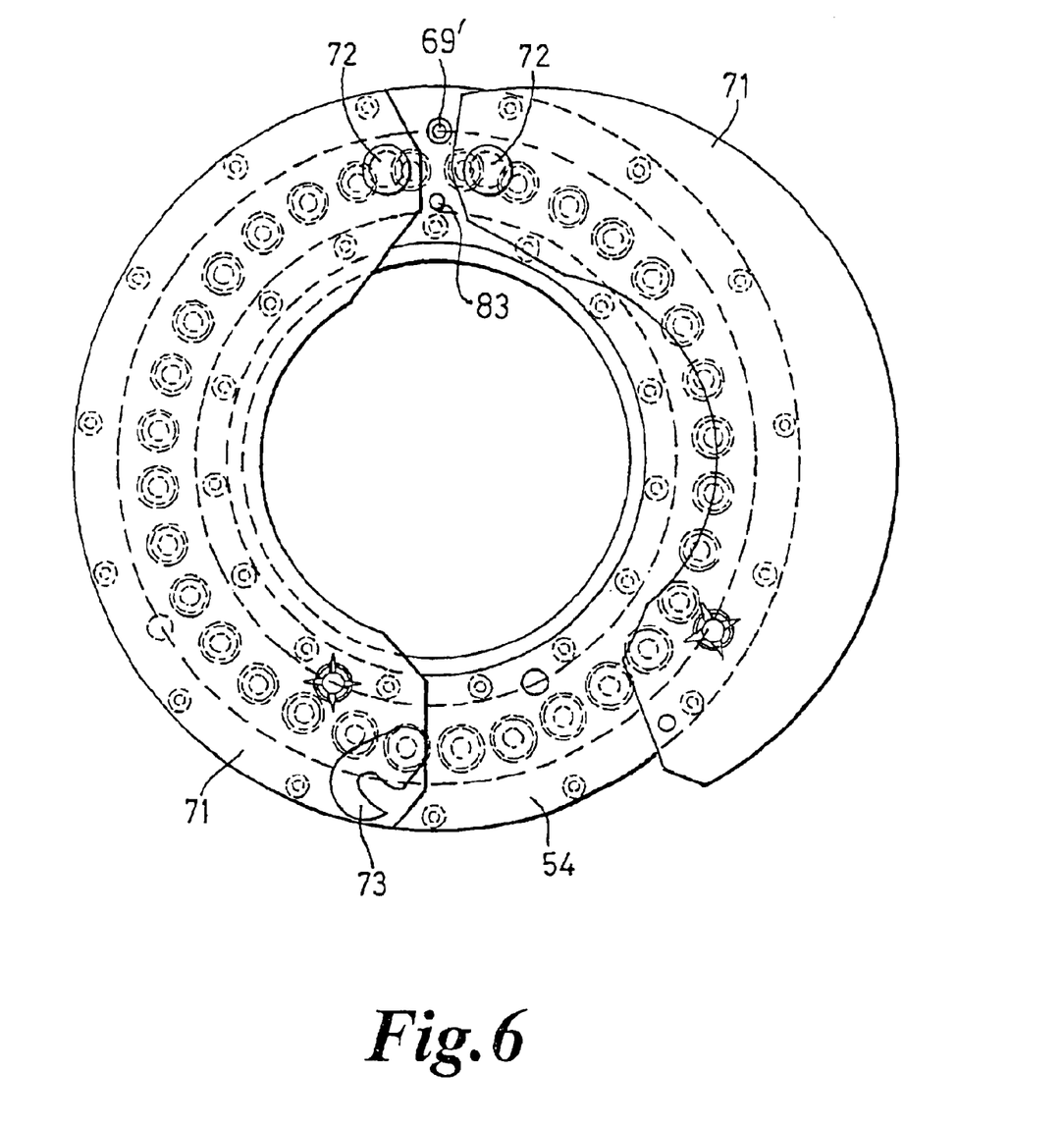
FIG. 6 is a schematic end view of the fastening apparatus of FIG. 5.

FIGS. 5 and 6 show a second embodiment of the fastening apparatus. This is designed such that it may become at least semi-permanently attached to a chock, thus minimising the need for using cranes to fit the apparatus to the chock. The apparatus comprises an annular housing 50 which is partially hollow and which comprises an outer circumferential side wall 51, an inner circumferential side wall 52 and an axially inner radial end wall 53. An axially outer radial end wall is provided for the annular body by a closure cap 54, attached to the two side walls by cap screws 55. The axially inner end wall 53 is provided with internal annular shoulders 56. An annular recess 57 is provided between the shoulders. An annular piston 58 is located within the housing 50 of the fastening apparatus. The piston is generally T-shaped in cross section, and is provided with annular shoulders 59. Annular o-ring seals 60 are seated against the shoulders 59.

At thirty-two positions around the annular housing 50 (see FIG. 6) a number of additional features are provided in the fastening apparatus. At each position, a hole 61 (FIG. 5) is provided in the axially radial inner end wall 53, the hole co-operating with the recess 57. The piston comprises a locating portion in the form of a stem 62 movably received in a recess 63 provided in the body of the piston. The stem locates in the hole 61 and forms a sliding fit within the hole. The stem comprises a first cylindrical part 64 and a second cylindrical part 65 connected together by a plate 66. A stack of disc springs 67 is located around the part 64 between the body of the piston and the plate 66. The springs when tensioned will act to urge the stem 62 towards the axially inner radial end wall 53 of the housing 50, causing it to extend through the hole 61 and beyond the housing. A die spring 68 is located around the second cylindrical part 65 of the stem and acts between the plate 66 and the axial inner radial end wall 53 of the housing to urge the stem away from this wall towards the body of the piston.

The hydraulic means 69 of the apparatus comprises an opening 69' (FIG. 6), adapted for the attachment thereto of a grease gun, which opening cooperates with an annular chamber 70 (FIG. 5) provided between the piston 58 and the closure cap 54.

The fastening apparatus further comprises a pair of fastening arms 71 (FIG. 6). Each arm comprises an arcuate plate, and is pivotably attached to the closure cap 54 by a pin 72 such that it can be moved from an open position to a closed position as shown. The fastening arms are fixed in the open position by location of spring loaded index pins (not shown) in holes in the housing. To place them in the closed position, the pins are removed from the holes, allowing the arms to swing into the closed position, in which they are fixed by location of the pins in further holes in the housing and a captive washer 73. The outer circumferential side wall 51 of the housing 50 of the fastening apparatus is provided with an annular rim 74 in which one or more pins (not shown) are accommodated.

The operation of the fastening apparatus will now be described. The fastening apparatus is used to fasten together a roll 75 relative to a cylindrical chock 76. The fastening apparatus is placed between a first end of the roll and a first end of the chock. The second end of the chock is located relative to the roll, by abutment against a shoulder (not shown) provided on the roll. The second end of the roll may be fastened to a second chock, by a fastening apparatus as herein described. The fastening apparatus is first attached to the chock. The chock comprises a cylindrical bearing follower 77, which is provided with a spacer plate 78 bolted onto the chock (which requires little or no modification thereto). The spacer plate is provided with a recess 79. The rim 74 of the outer circumferential side wall 51 of the fastening apparatus is located in the recess 79. This allows rotation of the fastening apparatus relative to the chock and a certain amount of axial movement between the apparatus and the chock, but prevents inadvertent removal of the fastening apparatus from the chock. As will be appreciated, the fastening apparatus can remain in place on the chock, there is no need to remove the apparatus therefrom to disengage the chock from the roll.

The first end of the roll 75 comprises a neck portion 80 of reduced diameter and a head portion 81. To fasten the roll to the chock, the fastening arms 71 of the fastening apparatus are first placed and held in the open position. The first end of the roll is then inserted through the aperture in the chock such that the neck portion 80 is surrounded by the fastening apparatus and the head portion 81 extends beyond the closure cap 54 of the fastening apparatus, as shown in FIG. 5. The roll is of similar diameter to the bearing follower 77 and is a sliding fit within the bearing follower. The axial length of the fastening apparatus in this embodiment is of such size that the apparatus can be located between the bearing follower 77 and the head portion 81 of the roll. The fastening arms 71 are then placed and fixed in the closed position in which they locate around the neck portion 80 of the roll.

To activate the fastening apparatus grease from a grease gun is introduced, via opening 69', into the annular chamber 70. Introduction of grease into this chamber provides a hydraulic pressure which causes the piston 58 to be forced away from the closure cap 54, forcing the stems 62 of the piston against the outer axial face of the bearing follower 77 and causing the stacks of disc springs 67 and the die springs 68 to compress. Sufficient hydraulic pressure is applied to the apparatus to achieve the design force of the apparatus, which in this embodiment is 50 tonnes force. A threaded locking collar 82 provided around the piston is then rotated into an operative position, and serves as a mechanical lock to provide additional securing of the position of the piston. The grease gun is then removed. The hydraulic pressure is maintained in the apparatus, and acts to push the stems 62 into engagement with the bearing follower 77, and to push the fastening arms 71, via the closure plate 54, into engagement with the axially inner surface of the roll head portion 81. As the second end of the chock is located against a shoulder of the roll, forcing the first end of the roll away from the first end of the chock fastens the roll and chock relative to each other. The fastening apparatus is designed to be capable of resisting an overload force of, for example, 100 to 200 tonnes force which may occur during use of the roll/chock assembly.

To unfasten the roll relative to the chock, the fastening apparatus is deactivated as follows. Grease is introduced into the chamber 70 to achieve a slight increase in the hydraulic pressure to allow the locking collar 82 to be rotated into an inoperative position. The hydraulic pressure is released by releasing the grease from the chamber 70 by removal of a blanking plug from a hole 83 (FIG. 6) in the apparatus housing. This allows the stems 62 of the piston to retract, away from the bearing follower 77. Such movement is aided by de-compression of the die springs 68. Release of the hydraulic pressure also allows de-compression of the stacks of disc springs 67, removing all force from the apparatus. The fastening arms 71 are then placed and held in the open position, and the roll can be removed from the chock and fastening apparatus.

When in use, the chock may move away from the fastening apparatus (for example by approximately 0.5 to 1 mm), or the distance between the first end of the chock and the roll may increase due to wear. This may cause at least a partial loss of the force applied by the fastening apparatus to the roll and the chock. However, as the stacks of disc springs 67 are compressed on application of the hydraulic pressure, should the chock move in this way etc., the springs 67 will act to force the stems 62 away from the body of the piston 68 and towards and into engagement with the bearing follower 77 of the chock. Thus the disc springs apply a force to the roll and the chock, i.e. a live load is provided by the disc springs. A proportion of the original force applied to the chock and the roll by the hydraulic means is maintained by the disc springs.

What is claimed is:

1. A fastening apparatus for axially urging an annular chock into a retained position on a roll at which position a first end of the roll projects through and beyond a first end of the chock, said apparatus comprising:

an annular housing configured and dimensioned to be axially received on the first end of the roll at a location adjacent to the first end of the chock;

an annular piston axially shiftable within said housing;

a plurality of circumferentially spaced locating members positioned between said piston and said chock and projecting through corresponding openings in said housing;

fastening means engageable with the first end of said roll for resisting axial movement of said housing away from said chock; and pressure means acting on said piston for axially urging said locating members against the first end of the chock.

2. A fastening apparatus according to claim 1 wherein the pressure means comprises resilient means.

3. A fastening apparatus according to claim 2 wherein the pressure means further comprises hydraulic means.

4. A fastening apparatus according to claim 3 wherein the axial length of the fastening apparatus changes between an axially unconfined inoperative position and an operative position axially confined between said chock and said fastening means.

5. A fastening apparatus according to claim 4 characterised in that the axial length of the fastening apparatus in the inoperative position is larger than the distance between the first end of the chock and the fastening means engaged with first end of the roll, such that the housing may be accommodated therebetween but not the projecting locating members.

6. A fastening apparatus according to claim 4 wherein the axial length of the fastening apparatus in the operative position is such that the housing and the projecting locating members can be accommodated between the first end of the chock and the fastening means engaged with first end of the roll.

7. A fastening apparatus according to claim 4 wherein the axial length of the fastening apparatus is reduced between the inoperative and the operative positions, to allow the apparatus to be placed in the operative position.

8. A fastening apparatus according to claim 7 wherein said pressure means comprises a resilient means, and wherein the piston is forced against said resilient means by hydraulic means to withdraw the locating members at least partially into the housing to reduce the axial length of the apparatus to allow it to be placed in the operative position.

9. A fastening apparatus according to claim 8 wherein the force produced by the hydraulic means on the piston is removed once the apparatus has been placed in the operative position, and the resilient means acts alone to force the locating members of the piston into location with the first end of the chock and the fastening means into location with the first end of the roll.

10. A fastening apparatus according to claim 1 wherein the pressure means comprises hydraulic means.

11. A fastening apparatus according to claim 10 wherein the pressure means further comprises resilient means.

12. A fastening apparatus according to claim 11 wherein the hydraulic means applies hydraulic pressure to the apparatus to place it in the operative position and to maintain it in this position.

13. A fastening apparatus according to claim 12 wherein the hydraulic means applies hydraulic pressure between the piston and the housing to force the locating members against the first end of the chock, and the fastening means into location with the first end of the roll.

14. A fastening apparatus according to claim 11 wherein the resilient means applies a force to the chock and the roll, should the chock move away from the first end of the roll in use and the force applied by the hydraulic means is partially or wholly lost.

15. A fastening apparatus according to claim 14 wherein the resilient means is provided between a body portion of the piston and the locating members to force the locating members against the first end of the chock.

16. A fastening apparatus according to claim 15 wherein the resilient means is compressed by operation of the hydraulic means in placing the apparatus in the operative position.

17. A fastening apparatus according to claim 11 wherein the fastening means comprises a locking collar.

* * * * *